Jan. 6, 1925. 1,522,060
F. C. JACOBY
AGITATOR ACTUATING GEARING
Filed April 30, 1923 2 Sheets-Sheet 1
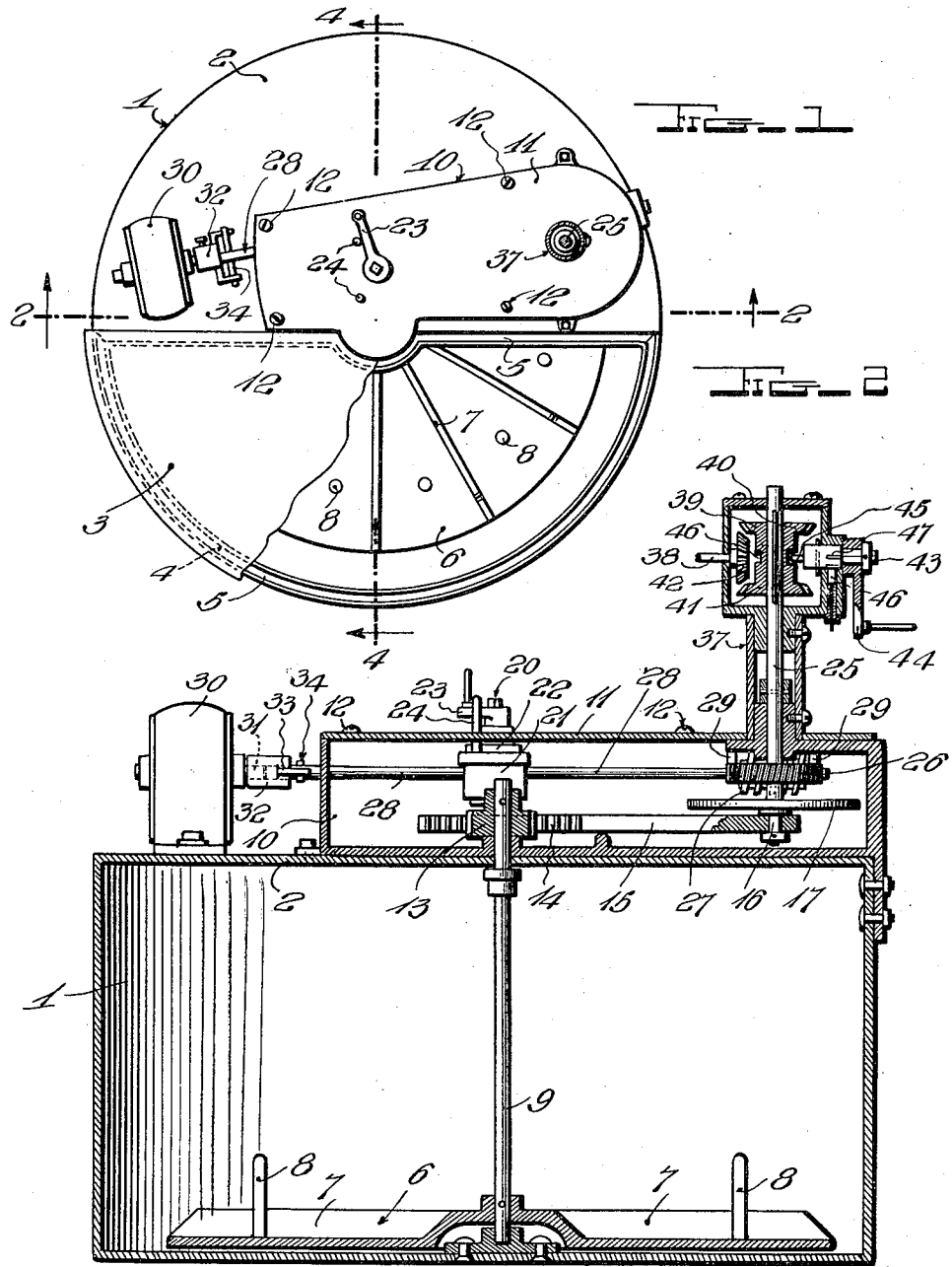
Inventor
Frank C. Jacoby
By C. C. Hiner,
Attorney

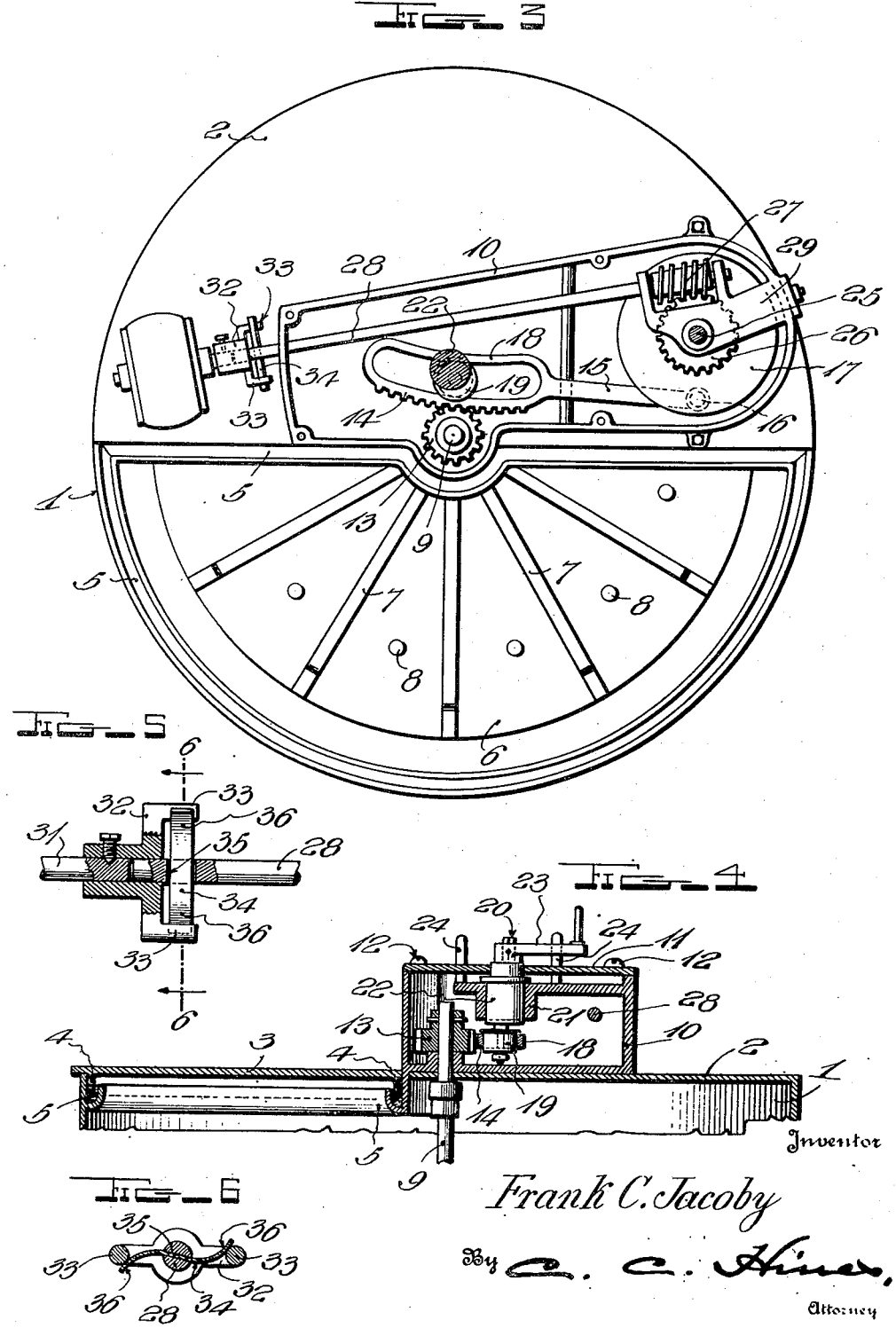

Patented Jan. 6, 1925.

1,522,060

UNITED STATES PATENT OFFICE.

FRANK C. JACOBY, OF KANSAS CITY, MISSOURI, ASSIGNOR OF ONE-FOURTH TO CHARLES W. BECHTEL AND ONE-FOURTH TO CARL W. BECHTEL, BOTH OF KANSAS CITY, MISSOURI.

AGITATOR-ACTUATING GEARING.

Application filed April 30, 1923. Serial No. 635,700.

*To all whom it may concern:*

Be it known that I, FRANK C. JACOBY, a citizen of the United States, residing at Kansas City, in the county of Jackson and State of Missouri, have invented new and useful Improvements in Agitator-Actuating Gearing, of which the following is a specification.

This invention relates to improvements in agitator actuating gearing and particularly to motor driven gearing of that type employing worm drive gearing and rack and pinion agitator actuating gearing operative thereby for transmitting, at properly reduced speed, driving motion from an electric or other continuously driven motor to a rotary agitator or impeller, such, for example, as the rotary agitator of a clothes washing machine.

One object of the invention is to provide rack and pinion gearing including a rack member driven by a crank connection from the worm drive gearing and having associated therewith guiding and shifting means whereby said rack is permitted as it reciprocates to have oscillating motion to conform to the rotary motion of its actuating crank, so that smoothness of action is ensured, and whereby irregular or jerky motions and excessive wear and tear resulting therefrom will be reduced to the minimum.

A further object of the invention is to provide guiding and shifting means for the rack bar whereby said bar may be readily and conveniently thrown into and out of action at any time without arresting the action of the motor drive shaft.

A still further object of the invention is to provide a type of gearing of the character described which is simple of construction, smooth, reliable and efficient in action and adapted to be operated at a low power cost, and which gearing is enclosed so as to be effectually protected at all times from dust or injury and so as to effectually run in a suitable lubricant, whereby ease of operation and a material reduction of friction is ensured.

A still further object of the invention is to provide a clutch connection between the motor and the drive shaft which will allow independent motion of the motor shaft in the case of an overload upon the drive shaft, thereby obviating liability of the burning out of the motor or of breakage of parts, such connection being further adapted to produce a warning sound or signal indicating to the operator the cause of the trouble.

A still further object of the invention is to provide a seal for closing the joint between a wash tub body and its removable lid or cover section, thus preventing the escape of water, steam or odors.

A still further object of the invention is to provide means whereby an auxiliary drive shaft, such as the shaft of a wringer drive gearing may be driven from the agitator drive gearing and thrown into and out of action and driven in opposite directions at will.

With these and other objects in view, the invention consists of the features of construction, combination and arrangement of parts, hereinafter fully described and claimed, reference being had to the accompanying drawings, in which:—

Figure 1 is a top plan view, with a portion of the removable lid or cover broken away, of a washing machine embodying my invention.

Figure 2 is a central vertical section through the same taken substantially on the line 2—2 of Figure 1.

Figure 3 is a view similar to Figure 1, showing the removable cover section of the tub and the cover of the gear casing removed to more clearly expose the working parts.

Figure 4 is a central vertical section taken substantially on the line 4—4 of Figure 1.

Figure 5 is a side elevation, partially in section, showing the clutch connection between the motor shaft and the drive shaft.

Figure 6 is an end view of the clutch motor on the motor shaft, taken on line 6—6 of Figure 5.

In carrying my invention into practice, as applied to a washing machine, I provide a washing machine comprising a tub or receptacle 1 to contain the clothes and cleansing fluid and the agitating means for imparting motion to the clothes and fluid. This tub or receptacle 1 may be of round, square or other suitable outline form, a round tub being shown in the present instance. At its top the tub is provided at one side of its center with a stationary cover section 2, which may be integral with the tub body or formed independently thereof and secured thereto in any suitable manner. The remainder of the top of the tub is left normally open for the entrance and removal of the clothes and cleansing fluid, and said normally open portion of the top is adapted to be closed by a removable lid or cover section 3. This removable lid or cover section 3 is provided around its marginal portion with a depending flange 4 adapted to fit down within a channel or well 5 formed along the inner diametrical edge of the fixed cover section 2 and the margin of the open side of the tub, which channel or well is designed to be filled with water or other sealing liquid when the machine is in use, into which liquid the flange 4 dips, forming a tight joint between the tub and its removable lid or cover section to prevent the escape of steam and odors as well as the splashing of water from the tub.

Arranged within the tub 1 is a rotary agitator or impeller 6, which may be of any suitable form and construction. In the present instance it is shown as comprising a circular disk-shaped body having radially arranged agitating ribs 7 and upstanding agitator pins or projections 8, designed to thoroughly agitate the clothes and cleansing fluid as the agitator rotates. The agitator is mounted upon the lower end of a vertical shaft 9 which is journaled at its upper end in the base of a gear casing 10 and extends upwardly into said gear casing. This gear casing is formed or provided upon the fixed cover section 2 and is closed at its top by a cover plate 11 detachably secured thereto by screws or other suitable fastenings 12. Upon the upper end of shaft 9 is a gear pinion 13 which meshes with the convexly-curved toothed portion 14 of a rack bar 15 coupled at one end to a crank pin 16 to a rotary crank disk 17.

The rack bar 15 is reciprocated by the rotary motion of the disk 17, which in turn meshes with the gear pinion 13 and thereby alternately transmits back and forth rotary motion to the agitator or impeller 6.

The toothed portion 14 of the rack bar 15 has formed upon one side a slotted or channeled yoke 18, in which slot or channel of the yoke operates a guide and shifting roller 19. This roller 19 is disposed between the longitudinal or side walls of the channel or slot and guides the toothed and yoked rack bar in its movements, said slot or channel having the same arc of curvature as the rack or such an arc of curvature as to permit the yoke, as the rack bar reciprocates, to have pivotal oscillating motion on the roller as an axis or center. By this means the toothed portion of the rack bar is maintained in meshing engagement with the teeth of the pinion 13, as said rack bar reciprocates back and forth, while at the same time the rack bar is permitted to swing or oscillate as it reciprocates to conform to the motion of the crank or wrist pin 16 in its rotation with the actuating crank disk 17. This ensures an accurate meshing operation of the above-described gearing parts, while preventing any jerky or irregular vibrating action thereof, ensuring a smooth working action being transmitted from one part to the other, thus reducing vibrations and wear and tear to the minimum. The roller 19 is mounted upon the lower end of a shifter shaft 20 extending upwardly through a bearing member 21 formed or provided within the casing 10 and outwardly through the cover 11 of said casing. Also carried by said shaft is an eccentric head or roller 22 which is fitted to turn in the bearing 21, and secured to the upper end of the shaft 20 is an actuating handle or lever 23 movable through a working arc between stop pins 24 provided upon the cover 11. By means of the handle 23 the shaft 20 may be turned through substantially a half revolution to adjust the eccentric 22 to shift the roller 19 inwardly and outwardly with the relation to the gear 13, thus adapting the roller 19 to be moved in one direction to hold the rack bar in working engagement with the gear 13 or moved in the reverse direction to throw said rack bar out of engagement with the gear 13, thus enabling the agitator operating mechanism to be thrown into and out of action whenever desired without arresting the motion of the primary drive gearing, as hereinafter described. The stop pins 24 are arranged on one side of the line of the shaft 20 beyond center, so that when the eccentric 22 is adjusted to either of the positions described, it will be locked or held in such position to positively hold the rack bar 15 shifted into or out of working position.

The crank disk 17 is mounted on a vertical transmission shaft 25 on which is also mounted a worm gear 26 receiving motion from a worm 27 mounted upon the inner end of a horizontal drive shaft 28. The worm is arranged between and the said inner end of shaft 28 is journaled in, the arms of a forked bearing bracket 29. The shaft 28 extends at its opposite end beyond the casing 10 and receives motion from an electric or other suitable drive motor 30. The shaft 28 is continuously driven from the motor in one direction, and the worm transmission gearing described provides a simple and reliable type of means for driving the agitator actuating rack and pinion gearing at a desirable comparatively low working speed from a motor working at a comparatively high constant speed, as will be readily understood.

A clutch connection is provided between the motor shaft 31 and the drive shaft 28 to secure a proper working coupling between said shafts, while permitting the motor shaft to turn independently in case of an overload upon shaft 28. This connection comprises a coupling member or head 32 fixed to shaft 31 and receiving the extremity of shaft 28, which has loose bearing therein, whereby proper alinement between said shafts is ensured. The head 32 is in the form of a yoke provided with a pair of spaced coupling lugs 33 extending on opposite sides of and parallel with the shafts, while the shaft 28 carries a cooperating coupling member 34. This coupling member 34 is in the form of an S-shaped or sinusoidally curved spring centrally held within and extending through a cross slot 35 in shaft 28 and terminating in the reversely extending curved arms 36, the convex faces of which engage the relatively reverse faces of the respective lugs in the orbit of revolution of the shaft 31. Normally a coupling engagement between the shafts is effected by engagement of the lugs 33 with the spring arms 36, the spring being stiff enough to provide such engagement up to a certain working load on shaft 28. Beyond this load point, however, the spring arms 36 will yield and allow the lugs 33 to ride over the same with a pawl and ratchet effect, so that, in the event of an overload of clothes upon the agitator, or any possible binding of the working parts of the contained drive gearing causing an overload on shaft 28, the motor shaft 31 will be permitted to turn independently of shaft 28. By this means, in case of an overload, danger of the breakage of the gearing parts will be prevented, as well as danger of the burning out of the motor, if an electric motor is used. Also as the lugs 33 in riding over the spring arms 36 will, under such conditions, produce a clicking sound, such sound will serve as a warning indication to the operator or attendant that an overload condition exists, so that measures may be taken to correct the difficulty.

Rising from the casing is a wringer supporting stand or head 37, to which a wringer, of which a drive shaft 38 only is shown, may be applied in any suitable manner. This head receives the shaft 25 which extends upwardly therethrough. Feathered to slide upon and rotate with said shaft 25 is a double bevel gear 39, having gear members 40 and 41 to mesh with a gear 42 on said wringer drive shaft 38. The gears 40 and 41 are adapted by vertical adjustment of the gear element 39 to be brought into engagement with the gear 42 for driving the wringer rolls forwardly or backwardly, as desired, and said gear element 39 may also be adjusted to a neutral position in which both gears 40 and 41 lie out of mesh with gear 42, which is the normal condition of said parts when the wringer is not in use. For adjusting the gear element to the positions described a rotary shaft or shifter 43 is provided, the same having an actuating handle 44 and carrying an eccentric pin 45 adapted for engagement with an annular groove 46 in the body or hub of the gear element 39. By turning the eccentric shifter to shift the pin to upper and lower positions the gear element 39 may be raised to engage gear 40 with gear 42 or lowered to engage gear 41 with gear 42 and by bringing the pin to any intermediate position both gears 40 and 41 will be moved to an idle position. A spring pressed locking member 46 is provided to engage any one of three locking notches 47 in the shifter, whereby the parts may be locked in an obvious manner in any of the three stated positions. The construction described permits actuation of the wringer, including both back and forth movement of the wringer rolls, from the motor drive gearing of the machine, as will be readily understood.

Any suitable means may be employed to support and guide the rack bar 15 in its movement, as, for example, a suitable rib or support on the base of the casing 10. This casing is designed in practice to be closed fluid-tight by its cover 11, so that said casing may be filled with a suitable lubricant in which the gear elements may work, thus reducing friction and ensuring ease of operation.

From the foregoing description, the construction, mode of operation and advantages of my invention will be readily understood by those versed in the art without a further and extended description. While the structure shown is preferred, it is, of course, to be understood that modifications and equivalents, fully within the scope of the appended claims, may be made without departing from the spirit or sacrificing any of the advantages of the invention.

Having thus fully described my invention, I claim:—

1. In an agitator actuating gearing, an agitator actuating shaft carrying a pinion, primary driving means, a crank actuated thereby, a rack driven by said crank and meshing with the pinion, a guide roller for sliding and pivotal engagement with the rack, an eccentric shaft carrying said roller, and means for adjusting said shaft for shifting said roller to move the rack into and out of mesh with the pinion.

2. In agitator actuating gearing, a drive shaft, an agitator shaft carrying a pinion, a slotted rack meshing with the pinion, a crank driven from the drive shaft and coupled to the rack, a rotatable guide for the rack rotatably and slidably engaging the walls of the slot thereof and forming a pivotal support on which the rack may oscillate as a center of motion in its reciprocations, and means for shifting said guide so as to positively throw the rack bar into or out of engagement with the pinion.

3. In agitator actuating gearing, a drive shaft, an agitator actuating shaft carrying a pinion, a combined reciprocatory and oscillatory rack having gear teeth for engagement with said pinion, a roller engaging the rack and forming a guide for said rack in its reciprocations, as well as a pivotal support for the rack adapting it to oscillate in its reciprocations, and means for shifting the position of said roller to throw the teeth of the rack into and out of engagement with the pinion.

4. In agitator actuating gearing, a drive shaft, an agitator actuating shaft carrying a pinion, worm gearing actuated by the drive shaft, a crank actuated by said worm gearing, a combined reciprocatory and oscillatory rack actuated by said crank and adapted for engagement with said pinion, a roller support for the rack to guide it in its reciprocating motions and forming a pivot member on which the rack is adapted to have oscillating motion, and means for shifting said roller support to throw the rack into and out of engagement with the pinion.

5. In agitator actuating gearing, a drive shaft, an agitator actuating shaft carrying a pinion, a combined oscillatory and reciprocatory rack for actuating said pinion, means for actuating said rack from the drive shaft, a roller guide and pivotal support for the rack, an eccentric for shifting said roller to throw the rack into and out of engagement with the pinion, and means for shifting said eccentric.

6. In an agitator actuating gearing, primary driving means, a pinion, an arcuately curved rack having a convex toothed face meshing with the pinion, crank mechanism for actuating the rack, worm gearing for driving the rack from the primary driving means, guiding means slidably and pivotally engaged with and coupled to the rack for permitting the rack to reciprocate and to oscillate in an arcuate path, and means for shifting said guiding means for moving the rack into and out of engagement with the pinion.

7. In an agitator actuating gearing, a drive shaft, an agitator actuating shaft carrying a pinion, crank mechanism actuated from the drive shaft, an arcuately curved rack having a convex toothed face meshing with said pinion, said rack being actuated by said crank mechanism, and a guide for the rack with which said rack is slidably engaged and forming a pivotal support on which the rack may oscillate as it reciprocates.

8. In an agitator actuating gearing, an agitator actuating shaft carrying a pinion, primary driving means, a crank actuated thereby, slotted rack driven by the crank and having a convex toothed face meshing with the pinion, a roller support in sliding engagement with the slot in the rack to permit reciprocating motions thereof and forming a pivotal support on which the rack may oscillate, and means for shifting said roller transversely of the line of reciprocation of the rack.

9. In an agitator actuating gearing, an agitator actuating shaft carrying a pinion, primary driving means, a crank driven by the primary driving means, an arcuately curved rack actuated by the crank and having a convex toothed face meshing with the pinion, said rack being provided with a guide slot, and a guide roller with which the walls of the slot are in sliding engagement, said roller permitting reciprocations of the rack through said sliding connection and forming a pivotal support on which the rack may oscillate laterally in said reciprocating motions.

10. In an agitator actuating gearing, an agitator actuating shaft carrying a pinion, primary driving means, a crank actuated thereby, a rack driven by said crank and meshing with the pinion, a guide roller having slidable and pivotal engagement with the rack, and means for shifting said roller for moving said rack into and out of mesh with the pinion.

11. In an agitator actuating gearing, a primary drive shaft, an agitator actuating shaft carrying a pinion, a transmission shaft, worm gearing between said primary drive shaft and transmission shaft, a crank driven by the transmission shaft, an arcuately curved rack driven by the crank and having a convex toothed face meshing with the pinion, a guide slidably engaging the rack to permit of its reciprocations and forming a pivotal support on which the rack may oscillate, and means for shifting said guide laterally of the line of reciprocation of the rack for moving its toothed face into or out of mesh with the pinion.

In testimony whereof I affix my signature.

FRANK C. JACOBY.